(12) United States Patent
Assouline

(10) Patent No.: US 7,844,015 B2
(45) Date of Patent: Nov. 30, 2010

(54) METHOD FOR CALIBRATING A QUADRATURE MODULATOR AND A MODULATION SYSTEM

(75) Inventor: Lior Assouline, Rishon Lezion (IL)

(73) Assignee: Bigband Networks, Inc., Redwood City, CA (US)

( * ) Notice: Subject to any disclaimer, the term of this patent is extended or adjusted under 35 U.S.C. 154(b) by 769 days.

(21) Appl. No.: 11/612,331

(22) Filed: Dec. 18, 2006

(65) Prior Publication Data

US 2008/0144736 A1 Jun. 19, 2008

(51) Int. Cl.
H04L 27/36 (2006.01)
(52) U.S. Cl. .................................... 375/298
(58) Field of Classification Search ................. 375/298, 375/301, 296, 261, 260, 259, 321, 320, 316, 375/295; 455/47, 39
See application file for complete search history.

(56) References Cited

U.S. PATENT DOCUMENTS

| 6,340,883 | B1 * | 1/2002 | Nara et al. ............... 324/76.78 |
| 6,459,458 | B1 * | 10/2002 | Balaban ..................... 348/678 |
| 6,618,096 | B1 * | 9/2003 | Stapleton .................... 348/608 |
| 7,369,813 | B2 * | 5/2008 | Andersson ............... 455/67.11 |
| 7,570,127 | B2 * | 8/2009 | Ryan et al. .................. 332/162 |
| 2004/0082305 | A1 * | 4/2004 | Kirschenmann et al. . 455/232.1 |
| 2008/0043881 | A1 * | 2/2008 | Franke ....................... 375/298 |

* cited by examiner

*Primary Examiner*—Kevin M Burd
(74) *Attorney, Agent, or Firm*—Reches Patents

(57) ABSTRACT

A method and system for calibrating a quadrature modulator. The method includes: determining a set of sideband calibration frequencies; for each sideband calibration frequency out of the set of sideband calibration frequencies: inputting an input signal having the sideband calibration frequency to the quadrature modulator; measuring a sideband signal power level; determining at least one calibration parameter in response to phase and gain imbalances expected at the measured sideband signal power level.

16 Claims, 8 Drawing Sheets

METHOD FOR CALIBRATING A QUADRATURE MODULATOR AND A MODULATION SYSTEM

FIELD OF THE INVENTION

The invention relates to a method for calibrating quadrature modulators and a modulation system.

BACKGROUND OF THE INVENTION

Information signals, such as data signals, media signals and especially compressed video and audio streams propagate over various communication channels, such as but not limited to terrestrial, wireless, satellite, wired and cable communication channels. Media streams usually include large amounts of information.

The transmission of information signals usually involves frequency conversion and modulation. There are various types of modulation schemes including QPSK, QAM modulation and the like. QPSK modulation is more robust than QAM modulation but is less efficient. In some cases QAM modulation is used for downstream transmission towards end users whereas QPSK modulation is used for upstream transmission from the end users.

QAM modulators are characterized by the size of their constellation. For example, a 256 QAM modulator has a constellation of 256 symbols that is spread within a complex plane. Each symbol has an in-phase component as well as a quadrature component.

Typically, QAM modulation of information streams includes the stages of: (a) receiving baseband information streams, (b) optionally, processing the information stream (for example applying error correction algorithms) to provide processed streams, (c) converting groups of processed stream signals to symbols, (d) generating in-phase components and quadrature components of the symbols, and (e) performing quadrature modulation to provide a complex stream of radio frequency signals. In a 256 QAM modulator each symbol represents a group of eight consecutive bits, and each symbol has a four-bit quadrature component and a four-bit in-phase component.

The following U.S. patents and U.S. patent applications, which are incorporated herein by reference, provide an illustration of the state of the art QAM modulators: U.S. Pat. No. 6,049,572 of Hansen, titled "Optimization of QAM constellation space for auxiliary I-Q signaling"; U.S. patent application 20030206600 of Vankka, titled, "QAM modulator"; U.S. patent application 20030147472 of Bach et al., titled "High speed QPSK MMIC and QAM modulator"; U.S. Pat. No. 6,693,970 of Vankka, titled "QAM modulator"; U.S. Pat. No. 6,687,311 of Zhang, titled "Direct QAM modulator with digital feedback control and complex pre-equalization for phase and amplitude distortion"; U.S. Pat. Nos. 6,430,228 and 6,141,387 of Zhang, titled "Digital QAM modulator using post filtering carrier recombination"; U.S. Pat. Nos. 6,118,826 and 5,848,102 of Zehavi et al., titled "Method and apparatus for encoding/decoding QAM trellis coded data"; U.S. Pat. No. 5,852,389 of Kumar, titled "Direct QAM modulator"; U.S. Pat. No. 5,450,044 of Hulick, titled "Quadrature amplitude modulator including a digital amplitude modulator as a component thereof"; U.S. Pat. No. 5,153,536 of Muller, titled "Suppressed carrier modulator formed from two partial modulators each including a phase delay path"; and U.S. Pat. No. 4,999,590 of Verdot, titled "Four state phase shift modulator, in particular for amplitude modulation of two carriers in quadrature with a large number of states".

FIG. 1 illustrates a prior art quadratue modulator 10. It converts an input in-phase baseband signal Ib(t) 12, and an input quadrature baseband signal Qb(t)14 to a single complex RF output signal RF(t)16.

Quadrature modulator 10 includes two mixers 22 and 24, local oscillator 30 and a 90° power splitter 36 and a combiner 40. The first mixer 22 receives as inputs Ib(t) 12 and a first carrier signal LOI(t) and outputs a modulated in-phase signal Im(t) 42. The second mixer 24 receives as inputs Qb(t) 14 and a second carrier signal LOQ(t) and outputs a modulated quadrature signal Qm(t) 44. The combiner 40 receives both modulated signals and outputs RF(t) 16.

Prior art quadrature modulators are characterized by gain, phase and offset imbalances between the I & Q branches. In addition to the modulated harmonics, these imbalances cause additional harmonics at the modulator output such as Carrier Leakage and Sideband.

FIG. 2 is a RF spectrum in which the x-axis represents the spectral components of the output signal of quadrature modulator 10 whereas the y-axis represents the amplitude or power of these spectral components. The spectral components include: (i) a carrier leakage component 52 at the carrier frequency (the frequency of the local oscillator 30); (ii) a desired output component 54 at a desired output frequency; and (iii) a sideband component 50 at a mirror frequency. These three spectral components are relatively proximate to each other thus merely performing spectral filtering is not effective.

Another model of a prior art quadrature modulator also includes two frequency dependent filters, one between each mixer and combiner, each represents frequency dependent effects that occur in the quadrature modulator.

The following U.S. patents and patent applications, as well as published articles, which are incorporated herein by reference, provide an illustration of the state of the art quadrature modulators and some also illustrate manners for quadrature modulation imbalance compensation: U.S. Pat. No. 6,618,096 of Stapleton, titled "System and method for adaptively balancing quadrature modulators for vestigial-sideband generation"; U.S. patent application 20040032913 of Dinur, titled "Method and apparatus of compensating imbalance of a modulator"; U.S. patent application 20040021516 of Oishi et al., titled "Distortion compensation apparatus"; U.S. patent application 20030231075 of Heiskala et al., titled "Amplitude imbalance compensation of quadrature modulator"; U.S. patent application 20030118121 of Makinen, titled "Method in digital quadrature modulator and demodulator, and digital quadrature modulator and demodulator"; U.S. patent application 20030095607 of Huang et al., titled "System and method for direct transmitter self-calibration"; U.S. patent application 20030053556 of Prabir, titled "Image-canceling quadrature modulator and method"; U.S. patent application 2002136324 of Nagasaka, titled "Circuit and method for compensating for non-linear distortion"; U.S. patent application 20030098752 and U.S. Pat. No. 6,657,510 of Haghighat, titled "Corrective phase quadrature modulator system and method"; U.S. patent application 20020071497 of Bengtsson et al., titled "IQ modulation systems and methods that use separate phase and amplitude signal paths and perform modulation within a phase locked loop"; U.S. patent application 20010016017 of Ishihara, titled "Quadrature modulator"; U.S. patent application 2004004515 of Takahashi, titled "Modulator and demodulator"; U.S. Pat. No. 6,700,453 of Heiskala et al., titled "Amplitude imbalance compensation of quadrature modulator"; U.S. Pat. No. 6,298,096 of Burgin, titled "Method and apparatus for determination of predistortion parameters for a quadrature modulator"; U.S. Pat. Nos.

6,208,698 and 5,883,551 of Marchesani et al, titled "Quadrature modulator imbalance estimator and modulator stage using it"; U.S. Pat. No. 5,847,619 of Kirisawa, titled "Method and system for calibrating a quadrature phase modulator"; U.S. Pat. No. 5,663,691 of Kowalik et al., titled "Estimator for estimating an operating defect in a quadrature modulator, and a modulation stage using the estimator"; U.S. Pat. No. 5,367,271 of Yamamoto, et al., titled "Quadrature modulator having phase shift and amplitude compensation circuits"; U.S. Pat. No. 5,705,958 of Janer, titled "Apparatus for correcting quadrature error in a modulator and/or in a demodulator for a signal having a plurality of phase states, a corresponding transmitter, and a corresponding receiver"; U.S. Pat. No. 5,293,406 of Suzuki, titled "Quadrature amplitude modulator with distortion compensation"; U.S. Pat. No. 5,105,195 of Conrad, titled "System and method for compensation of in-phase and quadrature phase and gain imbalance"; U.S. Pat. No. 4,890,301 of Hedberg, titled "Arrangement for compensating errors in a quadrature modulator"; U.S. patent application 20030231075 of Heiskala et al., titled "Amplitude imbalance compensation of quadrature modulator"; U.S. patent application 20040021516 of Oishi et al., titled "Distortion compensation apparatus"; U.S. patent application 20030045249 of Nielsen, titled "Feedback compensation detector for a direct conversion transmitter"; U.S. Pat. No. 5,355,101 of Ichihara et al., titled "Quadrature modulator having circuit for correcting phase error"; N. Vasudev and Oliver M. Collins, "Near-Ideal RF Upconverters" of N. Vasudev and Oliver M. Collins, published at IEEE Transactions on microwave theory and techniques, Volume 50, No. 11, November 2002; A. Guidi, P. McIllree and John Stannard, "Designing a high-speed modem for microwave, satellite communications", www.rfdesign.com. November 2001; R. Cushing, "Single sideband up-conversion of quadrature DDS signals to the 800-to-2500 Mhz band", Analog Dialogue, 34-3, 2000; J. Surber, C. Ventola, "Innovative Mixed-Signal Chipset Targets Hybrid-Fiber Coaxial Cable Modems", Analog Dialogue, 31-3, 1997.

Quadrature receivers also have to cope with gain and phase imbalances. The following U.S. patent applications, which are incorporated herein by reference, provide an illustration of the state of the art quadrature receivers and some also refer to quadrature receivers modulation imbalance compensation: U.S. Pat. No. 6,490,326 of Bastani et el., titled "Method and apparatus to correct for in-phase and quadrature-phase gain imbalance in communication circuitry"; U.S. Pat. No. 637,902 of Walley, titled "Gain imbalance compensation method and apparatus for a quadrature receiver"; U.S. Pat. No. 5,396,565 of Jasper et al., titled "Method for determining desired components of quadrature modulated signals"; U.S. patent application 20030139167 of Ciccarelli et al., titled "System and method for I-Q mismatch compensation in a low IF or zero IF receiver"; U.S. patent application 20030206603 of Husted, titled "Systems and methods to provide wideband magnitude and phase imbalance calibration and compensation in quadrature receivers"; U.S. patent application 20020160741 of Kim et al., titled "Image rejection mixer with mismatch compensation".

Since the sidebands and carrier leakage interfere with the desired modulated harmonics, there is a need to provide efficient methods for calibrating a quadrature modulator so as to remove these artifacts and to provide efficient modulation systems.

SUMMARY OF THE INVENTION

A method for calibrating a quadrature modulator, the method includes the stages of: determining a set of sideband calibration frequencies; for each sideband calibration frequency out of the set of sideband calibration frequencies: inputting an input signal having the sideband calibration frequency to the quadrature modulator; measuring a sideband signal power level; and determining at least one calibration parameter in response to phase and gain imbalances expected at the measured sideband signal power level.

A method for calibrating a quadrature modulator, the method includes the stages of: receiving or generating sideband compensation signals that have amplitude and phase; and determining a compensation filter in response to the phase and amplitude of the sideband compensation signals; wherein a real part of the compensation filter is responsive to an in-band component representative of a phase and amplitude of sideband compensation signals and wherein an imaginary part of the compensation filter is responsive to a quadrature component representative of the phase of sideband compensation signals.

A system for quadrature modulation, the system includes: a quadrature modulator and a calibration entity, connected to the quadrature modulator, adapted to: receive or generate sideband compensation signals that have amplitude and phase; and determine a compensation filter in response to the phase and amplitude of the sideband compensation signals; wherein a real part of the compensation filter is responsive to an in-band component representative of a phase and amplitude of sideband compensation signals and wherein an imaginary part of the compensation filter is responsive to a quadrature component representative of the phase of sideband compensation signals.

A system for quadrature modulation, the system includes: a quadrature modulator; a calibration entity, connected to the quadrature modulator, adapted to perform, for each sideband calibration frequency out of a selected set of sideband calibration frequencies, the stages of: (i) input an input signal having the sideband calibration frequency to the quadrature modulator; (ii) measure a sideband signal power level; and (iii) determine at least one calibration parameter in response to phase and gain imbalances expected at the measured sideband signal power level.

Conveniently, the at least one calibration parameter includes a gain calibration parameter and a phase calibration parameter. Typically, the gain calibration parameter is responsive to a maximal gain imbalance value at the measured sideband signal power level. Typically, the phase calibration parameter is responsive to a maximal phase imbalance value at the measured sideband signal power level.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE DRAWINGS

The following detailed examples refer to a QAM modulator. Those of skill in the art will appreciate that the invention can be applied to devices (such as but not limited to up-converters) that include modulators.

According to an embodiment of the invention the quadrature modulator is first calibrated such as to cancel carrier leakage and then is calibrated to compensate for sideband signals.

The first stage is known in the art, while the second stage is described herein below. The second stage can be applied independently from the first stage.

The carrier leakage calibration is not frequency dependent, thus the determination can be executed at a certain baseband frequency.

The second stage includes configuring a compensation filter, based upon multiple sideband calibrations signals measured at multiple frequencies that correspond to a baseband frequency range in which the quadrature modulator operates.

Figure 1:
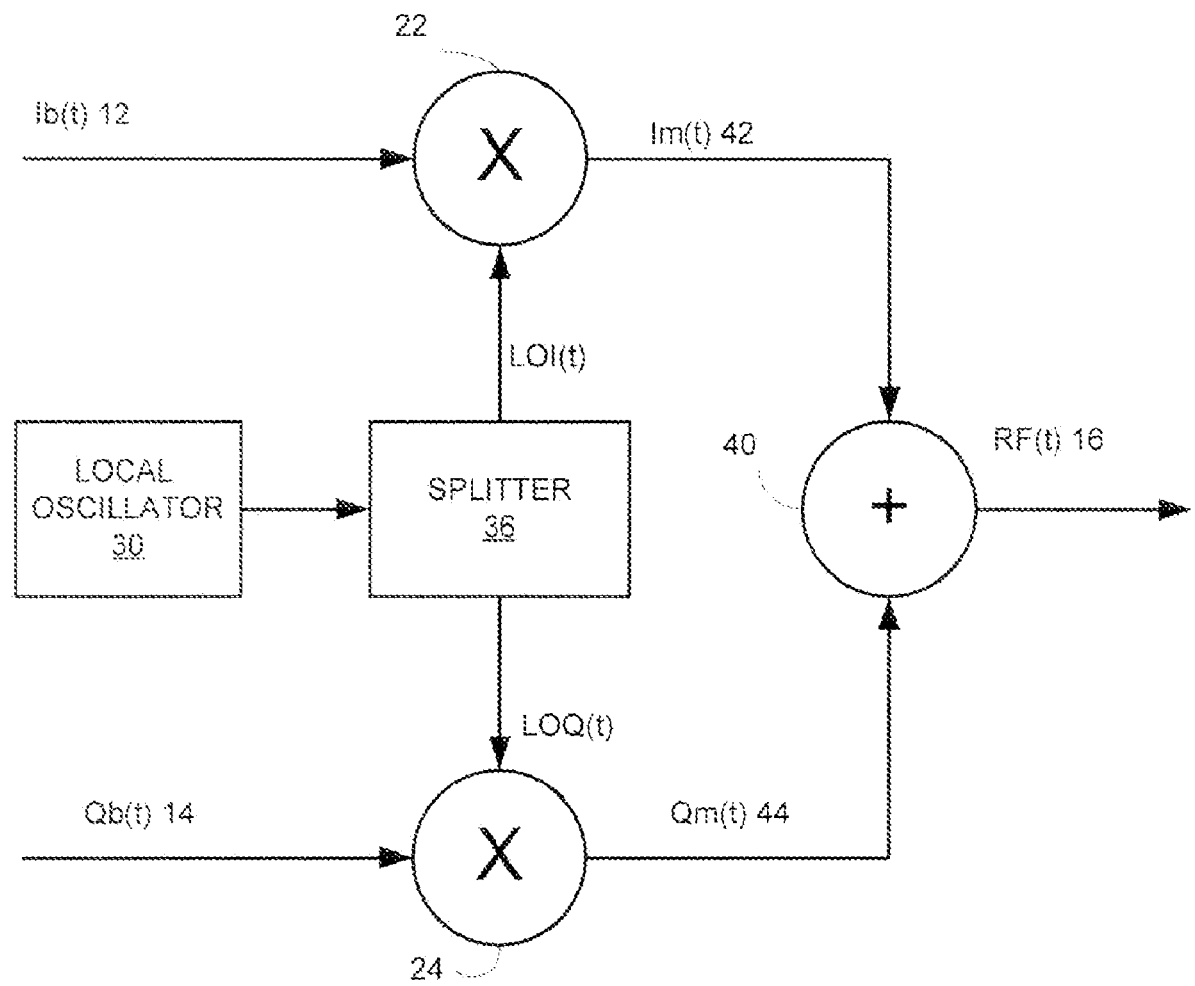
FIG. 1 is a prior art quadrature modulator.
Figure 2:
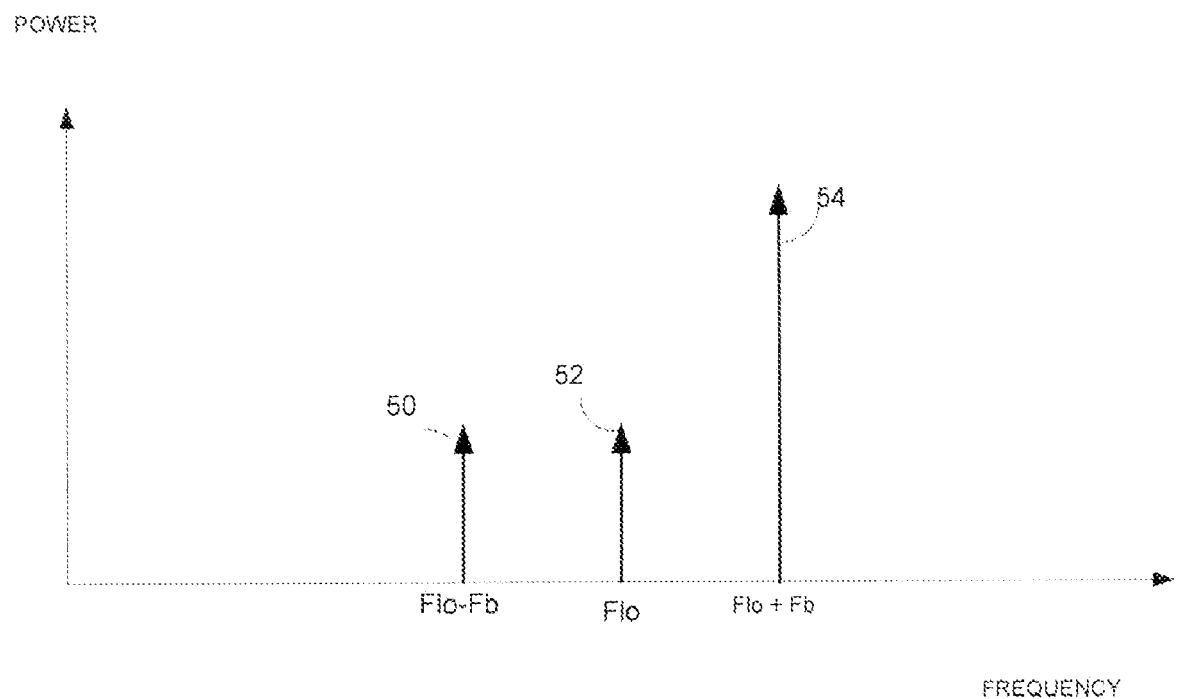
FIG. 2 is an RF spectrum of a spectral components of an output signal of a non-ideal quadrature modulator.
Figure 3:
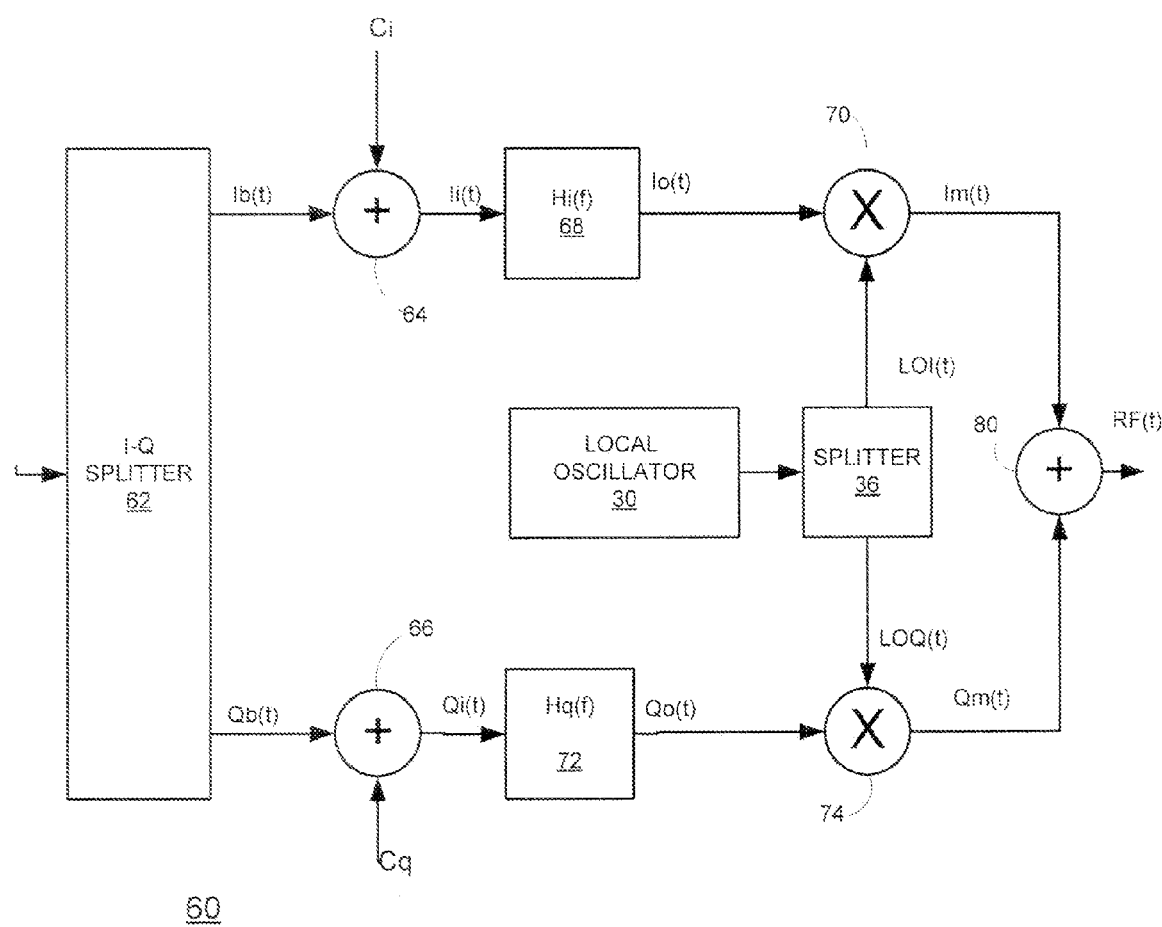
FIG. 3 illustrates a model of a non ideal quadrature modulator, according to an embodiment of the invention.

FIG. 3 illustrates a model 60 of a non-ideal quadrature modulator, according to an embodiment of the invention. The model 60 includes an I-Q splitter 62 that receives baseband signals and separates it to in-phase and quadrature input signals Ib(t) and Qb(t). Splitter 62 provides Ib(t) to an in-phase adder 64 and provides Qb(t) to a quadrature adder 66. The in-phase adder 64 adds an in-phase I offset calibration signal Ci to Ib(t) to provide in-phase signal Ii(t). Ii(t) enters a first filter Hi(f) 68 that outputs an in-phase output signal Io(t) that is provided to an in-phase mixer 70. The in-phase mixer 70 also receives a first carrier signal LOI(t) and outputs a modulated in-phase signal Im(t) 92. The quadrature adder 66 adds a quadrature Q offset calibration signal Cq to Qb(t) to provide quadrature signal Qi(t). Qi(t) enters a first filter Hq(t) 72 that outputs an quadrature output signal Qo(t) that is provided to an quadrature mixer 74. The quadrature mixer 74 also receives a second carrier signal LOQ(t) and outputs a modulated quadrature signal Qm(t) 94. Qm(t) and Im(t) and added by output adder 80 to provide a complex RF signal.

Filters Hi(f) and Hq(f) represent various frequency dependent phenomena as reflected in the baseband frequency range.

Figure 4:
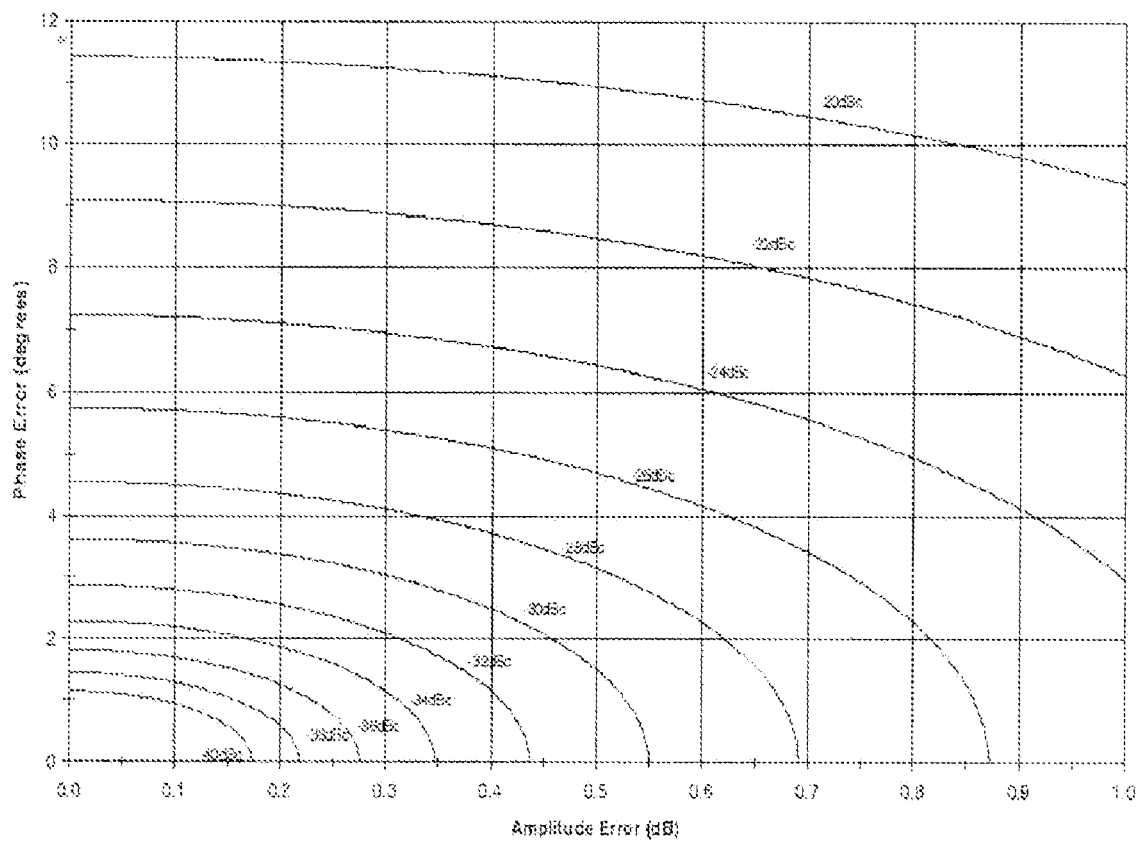
FIG. 4 illustrates at least one relationship between phase imbalance, gain imbalance and sideband power levels.

FIG. 4 illustrates a set of concentric elliptical shaped curves (collectively denoted 100) 100_1 till 100_k, each representing a relationship between gain imbalance and phase imbalance at a single quadrature modulator sideband signal power level. It is noted that the curves are out of scale and that many curves can be drawn between each pairs of illustrated curves. It is further noted that many other graphical formats can be used to illustrate said relationships without imparting from the scope of the invention. It is also noted that other relationships between representations of phase imbalances and gain imbalances can be taken in account when implementing the suggested method and system.

The following equations represent exemplary relationships between a measured sideband signal power level (SBP), a maximal value of gain imbalance for a given sideband signal power level of the quadrature modulator (MaxSideBand-Gain), and the maximal value of phase imbalance for that sideband signal power level (MaxSideBandPhase):

$$\text{MaxSideBandGain} = 20\log\{-2*(10^{SBP/10}+1)-\sqrt{[(2*10^{SBP/10}+2)^2-4*(10^{SBP/10}-1)^2]}\}-\log\{2*(10^{SBP}-1)\}. \quad (1)$$

$$\text{MaxSideBandPhase} = arc\{(1-10^{SBP/10})/(10^{SBP/10}+1)\}. \quad (2)$$

The phase imbalance-gain imbalance plane is split by the vertical axis (i.e. the phase imbalance axis) and the horizontal axis (i.e. the gain imbalance axis) to four quarters. At the upper right quarter both phase imbalance and gain imbalances are positive. At the lower right quarter the phase imbalance is negative while the gain imbalance is positive. At the lower left quarter both phase imbalance and gain imbalances are negative. At the upper left quarter the phase imbalance is positive while the gain imbalance is negative.

According to an embodiment of the invention input signals, to be injected during the calibration process, are selected such that extensive jumping from one of said quarter to another is prevented.

According to one embodiment of the invention the calibration process aims to provide pairs of input signals that are generated such that there is at least a reasonable probability that at least one out of each input signal pair will result in a lower sideband signal power level.

According to an embodiment of the invention the changes of the amplitude or phase of the input signals get smaller as the iterative process (illustrated, for example, in FIG. 6) converges.

Figure 5:
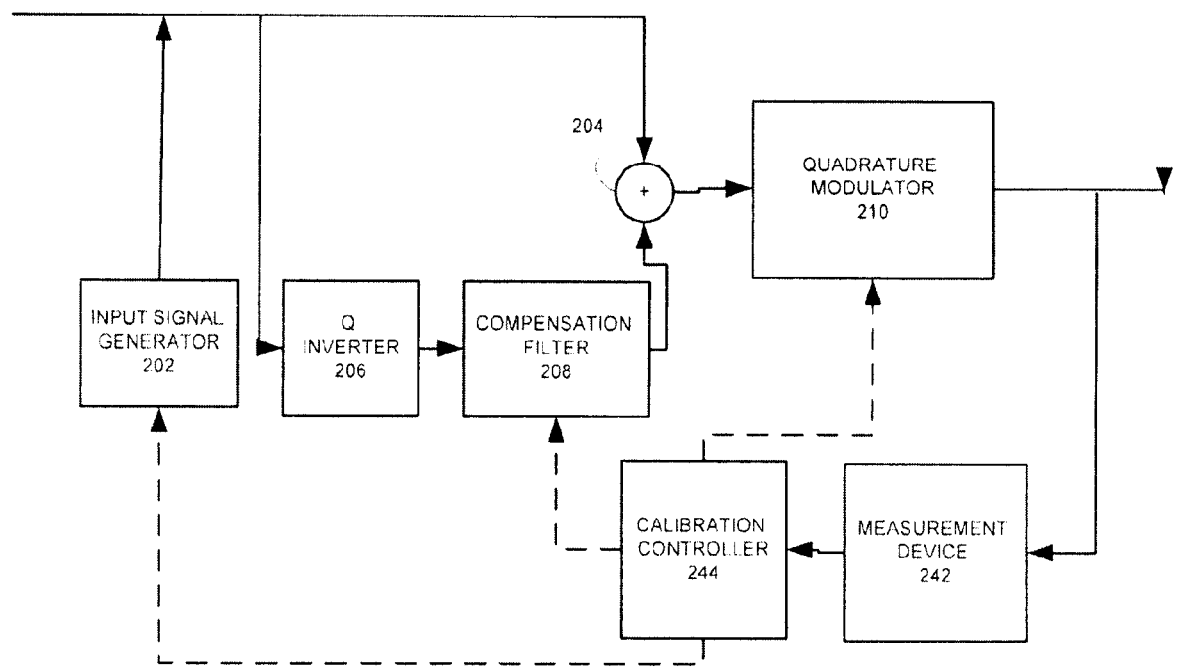
FIG. 5 illustrates a modulation system, according to an embodiment of the invention.

FIG. 5 illustrates a system 200 that includes an input signal generator 202, adder 204, quadrature modulator 210, measurement device 242, calibration controller 244, a complex compensation filter 208, and Q inverter 206.

Input signal generator 202, adder 204, measurement device 242, calibration controller 244, complex compensation filter 208 and Q inverter 206 can form a calibration entity, although the calibration entity can include less or more components, as well as other components.

The quadrature modulator 210 receives an output signal from adder 204 and outputs a RF output signal that is an output signal of system 200. This output signal is also fed to a feedback path that includes the measurement device 242, calibration controller 244 compensation filter 208, and frequency mirror 206. Measurement device 242 measures the power level of sideband signal and sends an indication of said quadrature modulator output signal to the calibration controller 244. The calibration controller 244 controls the calibration process and can determine which input signals to generate by input signal generator=202 and also determine the configuration of the compensation filter 208. The operation of the system 200 will be further illustrated in relation to the following figures.

The various components of system 200 may be proximate to each other, and even integrated into each other, but this is not necessarily so.

Figure 6:
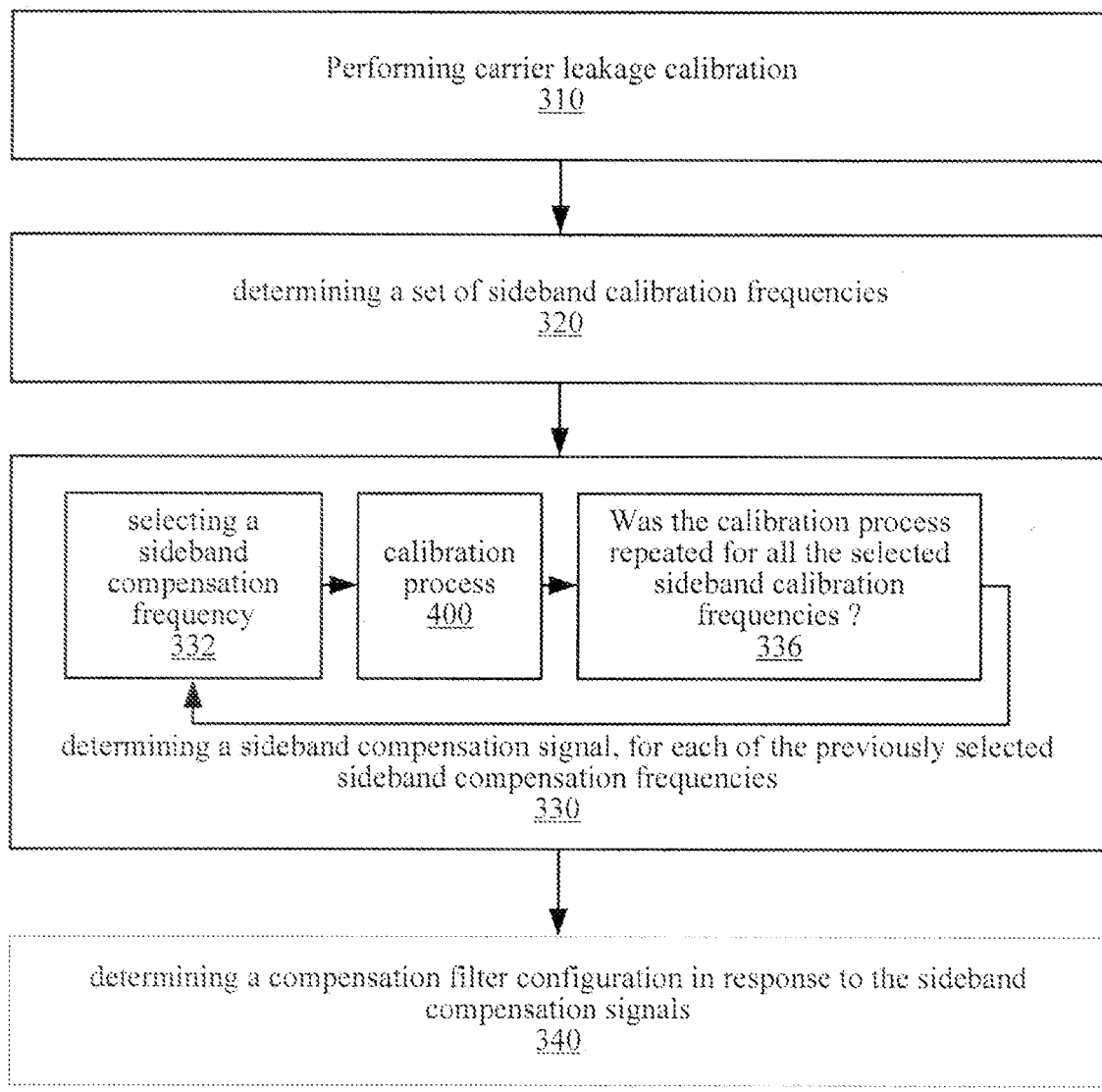
FIG. 6 illustrates a method for calibrating a quadrature modulator, according to an embodiment of the invention.

FIG. 6 illustrates a method 300 for calibrating a quadrature modulator, according to an embodiment of the invention.

Method 300 includes carrier leakage compensation as well sideband signal compensation.

Method 300 starts by stage 310 of performing carrier leakage calibration. The carrier leakage phenomenon does not dependent upon the frequency of baseband signals, and mainly includes determining Offset signals, such as Ci and Cq of FIG. 3, to be provided to the quadrature modulator.

Method 310 is followed by stage 320 of determining a set of sideband calibration frequencies. These frequencies are selected such as to represent a range of baseband frequencies that the quadrature modulator should be able to modulate. The distance between these sideband compensation frequencies may be fixed, but this is not necessarily so. For simplicity of explanation these sideband compensation frequencies are denoted as $F_1 \ldots F_K$.

Stage 320 is followed by stage 330 of determining a sideband compensation signal, for each of the previously selected sideband compensation frequencies.

Stage 330 includes performing for each sideband calibration frequency out of the set of sideband calibration frequencies the following stages: (i) inputting an input signal having the sideband calibration frequency to the quadrature modulator; (ii) measuring a sideband signal power level; and (ii) determining at least one sideband compensation signal in response to phase and gain imbalances expected at the measured sideband signal power level. These stages are included in calibration process 400 and are illustrated in a more detailed manner in relation to FIGS. 7 and 8. It is noted that the sideband compensation signals can be responsive to at least one calibration parameter.

Stage 330 may include: (i) stage 332 of selecting a sideband compensation frequency out of the set of selected sideband compensation frequencies, (ii) calibration process 400 that includes determining a sideband compensation signal at a single sideband compensation frequency, and (iii) stage 336 of determining if the calibration process 400 was repeated for all the selected sideband calibration frequencies or not. For simplicity of explanation these sideband compensation signals are denoted as $S(F_1) \ldots S(F_K)$. Each of these sideband compensation signals has an amplitude and a phase that are denoted $A(F_1) \ldots A(F_K)$ and $\theta(F_1) \ldots \theta(F_K)$, respectively.

Stage 330 is followed by stage 340 of determining a compensation filter configuration in response to the sideband compensation signals.

Stage 340 may include determining a compensation filter in response to the phase and amplitude of the sideband compensation signals.

Conveniently, the multiple sideband compensation frequencies are spread all over a predefined frequency range. Conveniently, the number of sideband compensation frequencies is in the order of the number of taps within the compensation filter.

A real part of the compensation filter is responsive to an in-band component representative of a phase and amplitude of sideband compensation signals and wherein an imaginary part of the compensation filter is responsive to a quadrature component representative of the phase of sideband compensation signals.

Conveniently, an in band component at a sideband compensation frequency substantially equals the product of a cosine of the phase of the sideband compensation signal at the sideband compensation frequency and of minus half of an amplitude of the sideband compensation signal at the sideband compensation frequency.

Conveniently, a quadrature component at a sideband compensation frequency substantially equals minus a sinus of an angle that is half of the phase of the sideband compensation signal at the sideband compensation frequency.

Thus, the phase and amplitude of the sideband compensation signals can be converted to in-phase components $(I(F_1) \ldots I(F_K))$ and quadrature components $(Q(F_1) \ldots Q(F_K))$:

$$I(F_k) = -0.5 * A(F_k) * \cos(\theta(F_k)) \quad (3)$$

$$Q(F_k) = -\sin(A(F_k)/2) \quad (4)$$

Whereas k is an index that ranges between 1 and K.

The compensation filter, such as compensation filter 208 or FIG. 5, can be a FIR filter that has a real part that is responsive to $I(F_1) \ldots I(F_K)$ and has an imaginary part that is responsive to $Q(F_1) \ldots Q(F_K)$. The FIR filter can be configures using various prior art algorithms, including the least square algorithm. The output of the compensation filter 208 is usually followed by the Q inverter 206 that adds to an input signal a spectral component at the image frequency having the same amplitude as the calculated sideband signal but at a phase difference or 180° so as to cancel it.

Figure 7:
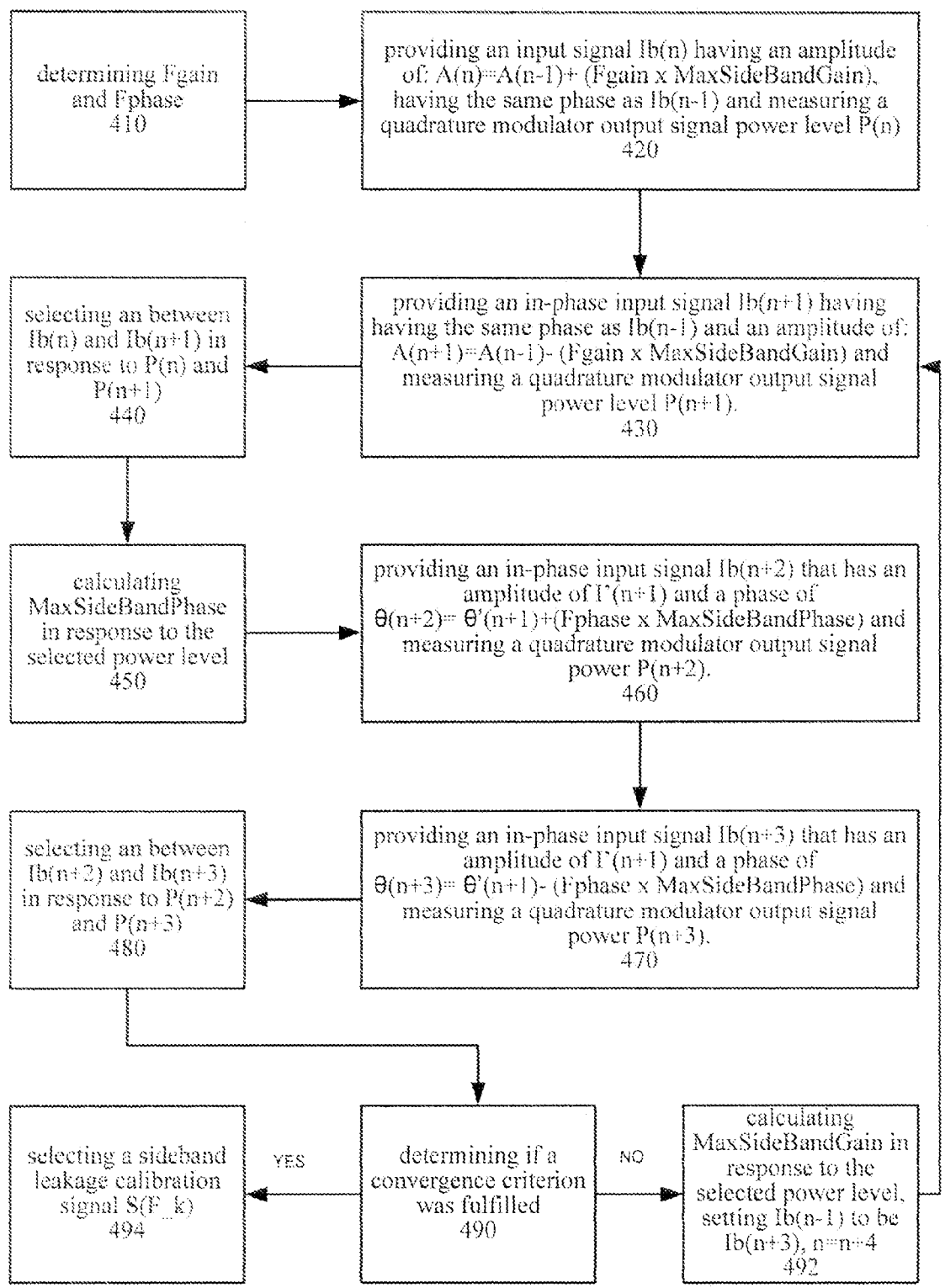
FIGS. 7-8 illustrate calibration processes that are applied to determine a sideband compensation signal, according to various embodiments of the invention.

FIG. 7 illustrates the calibration process 400 that is applied to determine a sideband compensation signal at a single sideband compensation frequency $F_k$. As mentioned above, this stage is repeated for multiple sideband compensation frequencies, in order to determine the sideband across a predefined frequency range. Conveniently, the multiple sideband compensation frequencies are spread all over this range. Conveniently, the number of sideband compensation frequencies is in the order of the number of taps within the compensation filter.

Conveniently, during the calibration process the process receives input baseband in-phase signals and input quadrature baseband signals. These signals can be generated by an input signal generator, but this is not necessarily so. For simplicity of explanation it is assumed that during the calibration process only an in-phase input signal Ib(t) is changed, while the quadrature input signal Qb(t) remains constant. This is not necessarily so as the quadrature input signal can be altered or even both input signals can be altered during the calibration process.

Method 400 includes inputting a sequence of input signals whereas the values of certain input signal properties (such as gain and/or phase) are responsive to previously measured sideband signal power level and one or more calibration parameters.

Conveniently, the calibration parameters are set in response to phase and gain imbalances expected at certain sideband signal power level. Conveniently, the calibration factors can be set in response to MaxSideBandGain and to MaxSideBandPhase.

Preferably, the gain calibration parameter is set to a fraction (denoted Fgain) of MaxSideBandGain and the phase calibration parameter is set to a fraction (denoted Fphase) of MaxSideBandPhase. The calibration parameters, as well as MaxSideBandGain and MaxSideBandPhase depend upon the measured power of a sideband signal.

Fgain and Fphase may differ from each other, but this is not necessarily so. The inventors set both to a value of 0.9 but other values (either smaller than one or even greater than one) can be used.

Smaller calibration parameters will result in a more stable but a slower convergence process. Larger calibration parameters (for example, larger than said maximal values) will result in a less stable conversion process.

Method 400 starts by stage 410 of determining Fgain and Fphase.

Stage 410 is followed by a sequence of stages 420-470 that can be repeated until a predefined calibration criterion is fulfilled. This criterion can reflect a required sideband signal power level, a maximal amount of sequence repetitions, a combination of both, and the like. As mentioned above it is assumed that input signal Qb(t) remains constant (for example, during stages 420, 430, 460 and 470) while input signal Ib(t) is altered.

Stage 420 includes providing an input signal Ib(n) having an amplitude (in logarithmic units) of: $A(n) = A(n-1) + (Fgain \times$ MaxSideBandGain) and measuring a sideband signal power level P(n). Whereas Ib(n) is an in-phase input signal that is inputted during the n'th iteration of the process. Ib(n) is provided at time t=T0+n*T, T0 being a time in which the sequence begun and T representative of a duration of a single sequence. A(n) is the amplitude of the current input in-phase signal, A(n−1) is the amplitude of a previous in-phase input signal and Fgain is a gain correction factor. Ib(n) has a phase of the previous input signal Ib(n−1). Index n is a positive integer representative of the amount of sequence repetitions.

Stage 420 is followed by stage 430 of providing an in-phase input signal Ib(n+1) having an amplitude of: A(n+1)= A(n−1)−(Fgain×MaxSideBandGain) and measuring a sideband signal power level P(n+1).

Stage 430 is followed by stage 440 of selecting between Ib(n) and Ib(n+1) in response to P(n) and P(n+1). Typically the selected in-phase input signal results in a smaller sideband signal power level. The selected input signal is denoted I'(n+1). Its amplitude is denoted A'(n+1) and its phase is denoted θ'(n+1).

Stage 440 is followed stage 450 of calculating MaxSideBandPhase in response to the selected power level (usually the smaller out of P(n) and P(n+1)).

Stage 450 is followed by stage 460 of providing an in-phase input signal Ib(n+2) that has an amplitude of A'(n+1) and a phase of θ(n+2)=θ'(n+1)+(Fphase×MaxSideBandPhase) and measuring a sideband signal power P(n+2). Whereas θ(n+2) is the current input signal phase, θ'(n+1) is the phase of I'(n+1) and Fphase is a phase correction factor.

Stage 460 is followed by stage 470 of providing an in-phase input signal Ib(n+3) that has an amplitude of A'(n+1) and a phase of θ(n+3)=θ'(n+1)−(Fphase×MaxSideBandPhase) and measuring a sideband signal power P(n+3).

Stage 470 is followed by stage 480 of selecting an between I(n+2) and I(n+3) in response to P(n+2) and P(n+3) and especially in response to the smaller out of the latter pair. The selected input signal is denoted I(n+3).

Stage 480 is followed by stage 490 of determining if a convergence criterion was fulfilled. If not—stage 490 is followed by stage 492 of calculating MaxSideBandGain in response to the selected power level, setting I(n−1) to be I(n+3), updating n by n=n+4 and jumping to stage 430. If the criterion was fulfilled stage 490 is followed by stage 494 of selecting a sideband calibration signal S(F_k).

It is noted that the convergence criterion can be responsive to MaxSideBandGain, the amount of iterations and the like. It is further noted that each of stages 420, 430 and 460 can be followed by stages such as stage 490 of determining whether to stop the calibration process. For simplicity of explanation it is not illustrated in FIG. 7.

Figure 8:
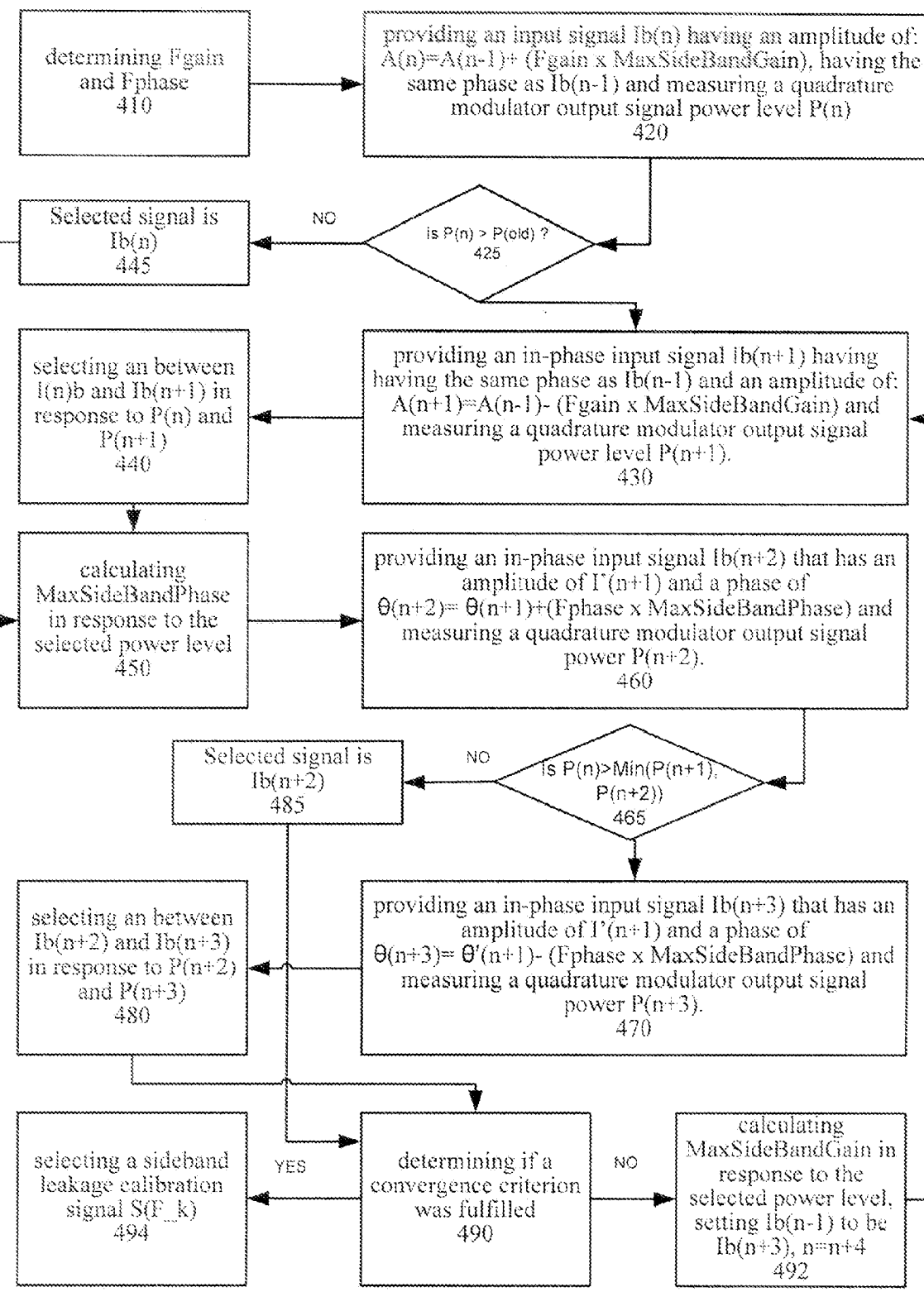

FIG. 8 illustrates method 500 according to an embodiment of the invention. [0079] Method 500 differs from method 400 in that pairs of input signals such as Ib(n) and Ib(n+1) are provided only if the provision of Ib(n) did not reduce the measured sideband signal power in relation to a previously measured sideband signal power (e.g.—power measured during previous iteration of method 400).

Thus, stage 460 is followed by stage 470 only if P(n+2) is bigger than P(n+1) and/or P(n+2).

Thus, stage 420 is followed by query stage 425 of comparing P(n) to previously measured power P(old), and stage 460 is followed by stage 465 of comparing P(n+3) to the smaller out of P(n+1) and P(n+2).

If P(n)<P(old) then query stage 425 is followed by stage 445 of selecting P(n). Stage 445 is followed by stage 450.

If P(n+2)<Min( P(n), P(n+1) then query stage 465 is followed by stage 485 of selecting P(n+2). Stage 485 is followed by stage 490.

According to an embodiment of the invention each iteration can include comparing the power to a threshold and proceeding accordingly.

According to another embodiment of the invention the compensation filter behavior is estimated and the calibration parameters are responsive to that estimate.

According to an embodiment of the invention the calibration parameter is selected such that for most gain imbalance values, at a certain sideband signal power, inputting at least one of the first and second input signals results in a decreased sideband signal power.

According to another embodiments of the invention the calibration parameter is selected such that for most phase imbalance values, at a certain sideband signal power, inputting at least one of the first and second input signals results in a decreased sideband signal power.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

I claim:

1. A method for determining a calibration parameter of a quadrature modulator, the method comprising the stages of:
   determining a set of sideband calibration frequencies;
   for each sideband calibration frequency out of the set of sideband calibration frequencies:
   inputting multiple input signals having the sideband calibration frequency to the quadrature modulator;
   for at least some of the multiple input signals:
   measuring a sideband signal power level; and
   determining a sideband compensation signal that is responsive to at least one calibration parameter, the determining is being responsive to phase and gain imbalances expected at the measured sideband signal power level; and
   wherein a first calibration parameter is a gain calibration parameter that is responsive to a fraction of a maximal gain imbalance value expected at the measured sideband signal value;
   wherein a second calibration parameter is a phase calibration parameter that is responsive to a fraction of a maximal phase imbalance value expected at the measured sideband signal value;
   wherein the multiple input signals comprise: a first input signal that is responsive to a sum of a previously inputted input signal and the first calibration parameter; a second input signal that is responsive to a difference between the previously inputted input signal and the first calibration parameter; a third input signal that is responsive to a sum of a previously inputted input signal and the second calibration parameter; and a fourth input signal that is responsive to a difference between the previously inputted input signal and the second calibration parameter;
   wherein the method further comprises determining a compensation filter configuration in response to sideband compensation signals for the set of sideband calibration frequencies wherein a real part of the compensation filter is responsive to an in-band component representative of a phase and amplitude of the sideband compensation signals and wherein an imaginary part of the compensation filter is responsive to a quadrature component representative of the phase of the sideband compensation signals.

2. The method of claim 1 wherein the maximal gain imbalance value is determined from measured sideband signal value as MaxSideBandGain=20 log$\{-2*(10^{SBP/10}+1)-\sqrt{[(2*10^{SBP/10}+2)2-4*(10^{SBP/10}-1)2]}\}-\log\{2*(10^{SBP/10}-1)\}$, wherein SBP stands for measured sideband signal value and MaxSideBandGain stands for the maximal gain imbalance value.

3. The method of claim 1 wherein the maximal phase imbalance value is determined from measured sideband signal value as MaxSideBandPhase=arctg$\{(1-10^{SBP/10})/(10^{SBP/10}+1)\}$, wherein SBP stands for measured sideband signal value and MaxSideBandPhase stands for the maximal phase imbalance value.

4. The method of claim 1 wherein the input signal is selected between first input signal and second input signal in response to measured sideband signal value of the first input signal and measured sideband signal value of the second input signal.

5. The method of claim 4 wherein the input signal is selected between third input signal and forth input signal in response to measured sideband signal value of the third input signal and measured sideband signal value of the forth input signal.

6. The method of claim 1 wherein the third calibration parameter is selected such that for most phase imbalance values, at a certain sideband signal power, inputting at least one of the third and forth input signals results in a decreased sideband signal power.

7. The method of claim 1 wherein the first calibration parameter is selected such that for most gain imbalance values, at a certain sideband signal power, inputting at least one of the first and second input signals results in a decreased sideband signal power.

8. The method according to claim 1 wherein the altering comprising determining a compensation filter configuration in response to the sideband compensation signals.

9. A system for quadrature modulation, comprising:
a quadrature modulator;
a calibration entity, comprising a measurement device and a calibration controller, coupled to the quadrature modulator, for each sideband calibration frequency out of a selected set of sideband calibration frequencies, the stages of: (i) inputting multiple input signals having the sideband calibration frequency to the quadrature modulator; and for at least some of the multiple input signals: (ii) measuring a sideband signal power level; (iii) determining a sideband compensation signal that is responsive to at least one calibration parameter, the determining is being responsive to phase and gain imbalances expected at the measured sideband signal power level; wherein a first calibration parameter is a gain calibration parameter that is responsive to a fraction of a maximal gain imbalance value expected at the measured sideband signal value; wherein a second calibration parameter is a phase calibration parameter that is responsive to a fraction of a maximal phase imbalance value expected at the measured sideband signal value; wherein the multiple input signals comprise: a first input signal that is responsive to a sum of a previously inputted input signal and the first calibration parameter; a second input signal that is responsive to a difference between the previously inputted input signal and the first calibration parameter; a third input signal that is responsive to a sum of a previously inputted input signal and the second calibration parameter; and a fourth input signal that is responsive to a difference between the previously inputted input signal and the second calibration parameter; and (iv) determining a compensation filter configuration in response to the sideband compensation signals for the set of sideband calibration frequencies; wherein a real part of the compensation filter is responsive to an in-band component representative of a phase and amplitude of sideband the compensation signals and wherein an imaginary part of the compensation filter is responsive to a quadrature component representative of the phase of the sideband compensation signals.

10. The system of claim 9 wherein the maximal gain imbalance value is determined from measured sideband signal value as MaxSideBandGain=20 log$\{-2*(10^{SBP/10}+1)-\sqrt{[(2*10^{SBP/10}+2)2 -4*(10^{SBP/10}-1)2]}\}-\log\{2*(10^{SBP/10}-1)\}$, wherein SBP stands for measured sideband signal value and MaxSideBandGain stands for the maximal gain imbalance value.

11. The system of claim 9 the maximal phase imbalance value is determined from measured sideband signal value as MaxSideBandPhase=arctg$\{(1-10^{SBP/10})/(10^{SBP/10}+1)\}$, wherein SBP stands for measured sideband signal value and MaxSideBandPhase stands for the maximal phase imbalance value.

12. The system of claim 9 wherein the input signal is selected between first input signal and second input signal in response to measured sideband signal value of the first input signal and measured sideband signal value of the second input signal.

13. The system of claim 9 wherein the input signal is selected between third input signal and forth input signal in response to measured sideband signal value of the third input signal and measured sideband signal value of the forth input signal.

14. The system of claim 9 wherein the third calibration parameter is selected such that for most phase imbalance values, at a certain sideband signal power, inputting at least one of the third and forth input signals results in a decreased sideband signal power.

15. The system of claim 9 wherein the first calibration entity selects the calibration parameter is selected such that for most gain imbalance values, at a certain sideband signal power, inputting at least one of the first and second input signals results in a decreased sideband signal power.

16. The system according to claim 9 further adapted to determine a compensation filter configuration in response to the sideband compensation signals.

* * * * *